US006678416B1

(12) United States Patent
Sun et al.

(10) Patent No.: US 6,678,416 B1
(45) Date of Patent: Jan. 13, 2004

(54) DETECTING AND SEGMENTING LOCAL DEFORMATION IN A TRACKED VIDEO OBJECT

(75) Inventors: Shijun Sun, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/500,116

(22) Filed: Feb. 8, 2000

(51) Int. Cl.$^7$ .................................................. G06K 9/36
(52) U.S. Cl. ...................................................... 382/235
(58) Field of Search ................ 348/384.1, 394.1–395.1, 348/400.1–404.1, 407.1–416.1, 420.1–421.1, 425.2, 430.1–431.1; 382/232, 233, 236, 238, 240, 242, 248, 250

(56) References Cited

U.S. PATENT DOCUMENTS

| 4,906,940 A |   | 3/1990 | Greene et al. |       |
|-------------|---|--------|---------------|-------|
| 5,768,438 A | * | 6/1998 | Etoh ..........................| 382/251 |
| 5,802,220 A | * | 9/1998 | Black et al. ................| 382/276 |
| 5,886,742 A | * | 3/1999 | Hibi et al. ...................| 348/402 |
| RE37,668 E  | * | 4/2002 | Etoh ..........................| 382/251 |

OTHER PUBLICATIONS

Kevrann, c.; "A Hierarchical Markov Modeling Approach for the Segmentation and Tracking of Deformable Shapes," Graphical Models and Image Processing vol. 60 No 3 May 1998, pp 173–195.
Jain, A.; "Object Matching Using Deformable Templates," IEEE Trans on Pattern Analysis and Mahine Intelligence Vol 18 No 3 Mar. 1996.
Meyer et al.; "Region–Based Tracking Using Affine Motion Models in Long Image Sequences," Image Understanding Vol 60 no 2 9/94 pp 119–140.
Zhong et al.; "Object Tracking Using Deformable Templates," 6th Int'l Conf. on Computer Vision (India) 1/98.
Singh et al. "Comparison of Daubechies, Coiflet and Symlet for Edge Detection"SPIE vol. 3074; 1997.
Amini et al., "Using dynamic Programming for Sloving Variational Problems in Vision;" IEEE Trans on Pattern Analysis and Machine Intelligence V12 n9 9/90.
Fujimara et al.; Motion Tracking of Deformable Objects Based on Energy Minimizations Using Multiscale Dynamic Programming 8186–2910 IEEE 1992.
Kakadiaris et al.; "Inferring 2D Object Structure from the Deformation of Apparent Contours;" Computer Vision and Image Understanding V65 n2 2/97.
Kass et al.; "Snakes: Active Contour Models;" Int'l Journal of Computer Vision pp 321–331; 1998.
Lai et al.; "Deformable Contours: Modeling and Extraction," IEEE Transaction on Pattern Analysis and Machine Intelligence, V17, n11, 11/95.

(List continued on next page.)

Primary Examiner—Jose L. Couso
(74) Attorney, Agent, or Firm—Steven P. Koda

(57) ABSTRACT

A coarsely estimated object boundary is formed by a sequence of edge boundary points. A local affine transformation along the estimated object boundary is identified by analyzing edge energy of a current image frame. A sequence of edge boundary points which have edge energy change ratios exceeding a threshold value is identified as a local affine transformation. A refined estimate of the object boundary is determined for the local affine transformation using a local segmentation process based on a key contour point search strategy. End points of the contour are assumed to be known. An initial key contour point is derived from the coarsely estimate object boundary. Candidate key points then are derived and corresponding curves analyzed to select a curve as the improved estimated boundary for the local affine transformation. The curve having a minimum average edge energy change ratio is selected.

27 Claims, 7 Drawing Sheets

OTHER PUBLICATIONS

Leymarie et al.; "Tracking Deformable objects in the Plane Using an Active Contour Model," IEEE Trans on Pattern Analaysis & Mach Int V15 n6 6/93.

Terzopouliis et al.; "Deformable Models," The Visual Computer, Springer—Verlag 1998.

Yuille et al.; "Feature Extraction from Faces Using Deformable Templates," Int'l Journal of Computer Vision 8:2 pp 99–111; 1992.

Staib et al.; "Boundary Finding with Parametrically Deformable Models," IEEE Trans on Pattern Analysis and Machine Int. V14, n11; 11/92.

Blake et al.; "A Framework for Spatiotemporal Control in the Tracking of Visual Contours," Int'l Journal of Computer Vision 11:2, pp127–145; 1993.

* cited by examiner

DETECTING AND SEGMENTING LOCAL DEFORMATION IN A TRACKED VIDEO OBJECT

CROSS REFERENCE TO RELATED APPLICATIONS

This invention is related to U.S. patent application Ser. No. 09/323,501 filed Jun. 10, 1999 naming Sun et al. titled, "Video Object Segmentation Using Active Contour Model with Global Relaxation." The content of such application is incorporated herein by reference and made a part hereof.

BACKGROUND OF THE INVENTION

This invention relates to tracking and segmenting an object within a sequence of image frames, and more particularly to methods and apparatus for segmenting and tracking a video object which may move or deform.

When tracking an object among multiple frames of a video sequence, an enclosed boundary of the object is identified in each frame. The object is the area within the boundary. The challenge in identifying the object boundary in a given frame increases as the constraints on a trackable object are relaxed to allow tracking an object which translates, rotates or deforms. Once the object is identified in one frame, template matching may be used in a subsequent frame to detect translation of the object. The template typically is the object as identified in the prior frame. Deformable models are used to detect objects which translate, rotate or deform. Various methods using deformable models are described below.

Yuille et al. in "Feature Extraction from Faces Using Deformable Templates," International Journal of Computer Vision, Vol. 8, 1992, disclose a process in which eyes and mouths in an image are identified using a model with a few parameters. For example, an eye is modeled using two parabolas and a circle radius. By changing the shape of the parabolas and the circle radius, eyes can be identified. Yuille et al. and other deformation models typically have encompassed only highly constrained deformations. In particular, the object has a generally known shape which may deform in some generally known manner. Processes such as an active contour model have relaxed constraints, but are only effective over a very narrow spatial range of motion. Processes like that disclosed by Yuille are effective for a wider spatial range of motion, but track a very constrained type of motion. Accordingly, there is a need for a more flexible and effective object tracker, which can track more active deformations over a wider spatial range.

Active contour models, also known as snakes, have been used for adjusting image features, in particular image object boundaries. In concept, active contour models involve overlaying an elastic curve onto an image. The curve (i.e., snake) deforms itself from an initial shape to adjust to the image features. An energy minimizing function is used which adapts the curve to image features such as lines and edges. The function is guided by internal constraint forces and external image forces. The best fit is achieved by minimizing a total energy computation of the curve. In effect, continuity and smoothness constraints are imposed to control deformation of the model. The model is the object from a prior frame. A shortcoming of the conventional active contour model is that small changes in object position or shape from one frame to the next may cause the boundary identification to fail. In particular, rather than following the object, the estimated boundary instead may latch onto strong false edges in the background, distorting the object contour. Accordingly, there is need for an improved method for segmenting and tracking a video object.

SUMMARY OF THE INVENTION

According to the invention, object segmentation and tracking is improved by identifying a local portion of an object and detecting local deformation of such portion. An advantage of this technique is that object segmentation and tracking is significantly improved for instances where there is significant local deformation.

According to one aspect, a local affine along a coarsely estimated object boundary is identified by analyzing edge energy of a current image frame. Edge energy for points along a coarsely estimated object boundary are compared to the edge energy's for such points in a previous frame. A sequence of contour points which have edge energy change ratios exceeding a threshold value is identified as a local affine. A refined estimate of the object boundary then is determined for the local affine.

According to another aspect, a local segmentation process based on a key contour point search strategy is implemented to refine the object boundary at the local affine. The local affine can be characterized in two equations having six unknown parameters which describe the shape of the local affine. These parameters are unknown and represented as six independent equations. Knowledge of the actual parameter would provide an indication of the actual local affine location. An improved estimate of the affine location is derived by reducing the set of equations. A value for each parameter is obtained by making an assumption and by selecting a key point. The assumption is that the front end point and back end point for the local affine move comparably with the main portion of the object. Thus, these points are taken as being the points from the coarsely estimated object boundary. A key point along the coarsely estimated object boundary is selected based upon a distance function. The front point, back point and key point define a curve shape. By selecting a better key point a better curve may be estimated for the local affine.

Candidate key points are selected from a search area. The candidate points are identified within the search area as being any image pixel point that has an edge energy which is larger than a prescribed percentage of the edge energy for the key point found in the previous frame. A corresponding set of parameters then is derived for each candidate key point based on the candidate key point, the front point and the back point.

The coarsely estimated boundary of the local affine then is warped using each set of parameters to derive a candidate curve corresponding to each candidate key point. An average edge energy change ratio for each given curve is derived, and the curve having the minimum value of the average edge energy change ratio values is selected as the optimal curve to estimate the boundary of the local affine. A set of edge points for the selected optimal curve is output as the set of edge points for the local affine portion of the object.

Note that the process for selecting a local affine is independent of the process for improving the boundary estimate for the local affine. The process for selecting the local affine may be used with any process for improving the estimated shape and location of the identified local affine. Similarly, the process for improving the boundary of a local affine can be used for any local affine regardless of how identified.

According to one advantage of the invention, an object boundary for a deformable or movable object is more accurately tracked by providing local segmentation for an identified area of the object. These and other aspects and advantages of the invention will be better understood by reference to the following detailed description taken in conjunction with the accompanying drawings.

DESCRIPTION OF SPECIFIC EMBODIMENTS

Overview

Figure 1:
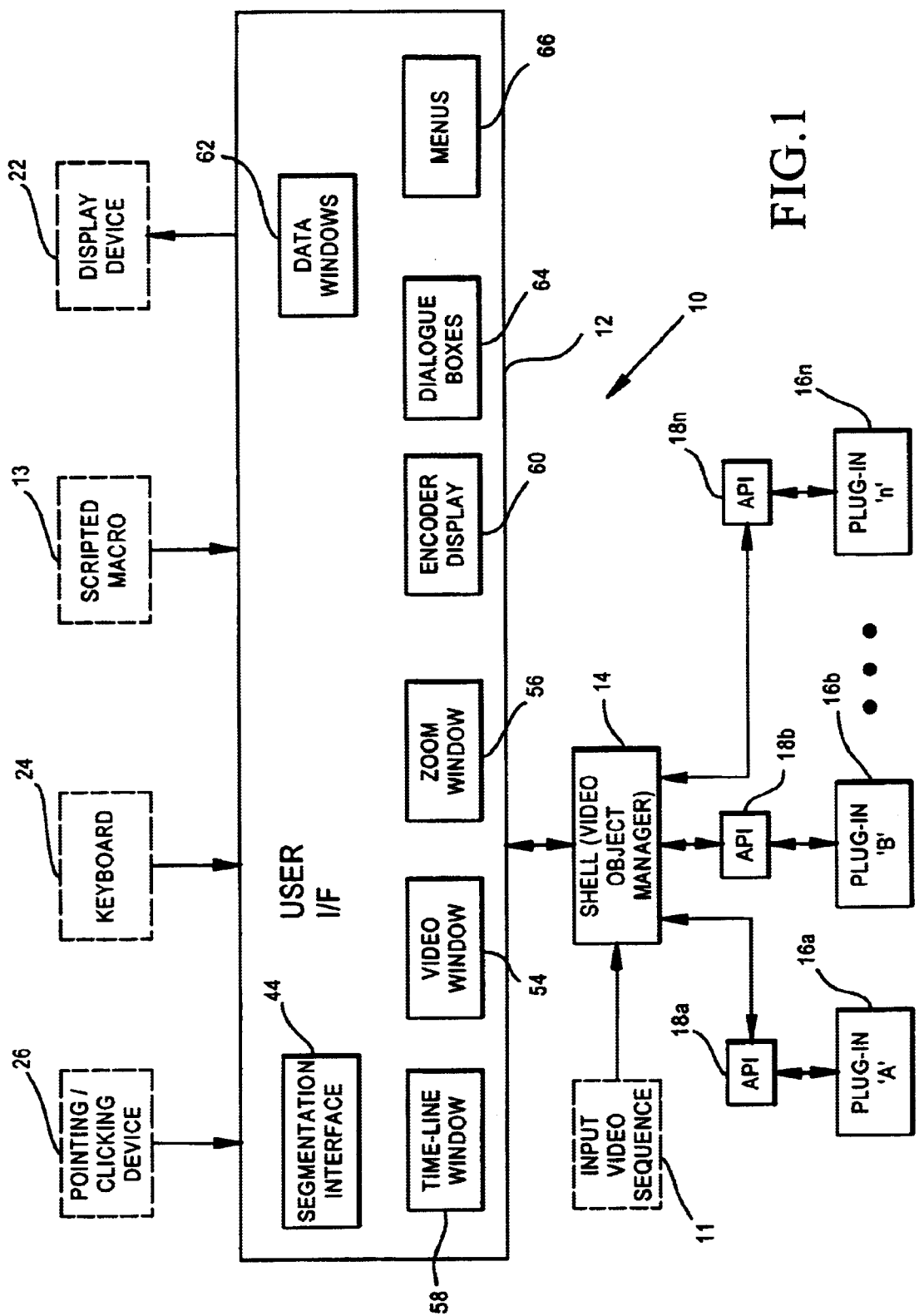
FIG. 1 is a block diagram of an interactive processing environment for tracking video objects among a sequence of video frames.

FIG. 1 shows a block diagram of an interactive processing environment 10 for locating, tracking and encoding video objects. The processing environment 10 includes a user interface 12, a shell environment 14 and a plurality of functional software plug-in programs 16. The user interface receives and distributes operator inputs from various input sources, such as a point and clicking device 26 (e.g., mouse, touch pad, track ball), a key entry device 24 (e.g., a keyboard), or a prerecorded scripted macro 13. The user interface 12 also controls formatting outputs to a display device 22. The shell environment 14 controls interaction between plug-ins 16 and the user interface 12. An input video sequence 11 is input to the shell environment 14. Various plug-in programs 16a–16n may process all or a portion of the video sequence 11. One benefit of the shell 14 is to insulate the plug-in programs from the various formats of potential video sequence inputs. Each plug-in program interfaces to the shell through an application program interface ('API') module 18.

Figure 2:
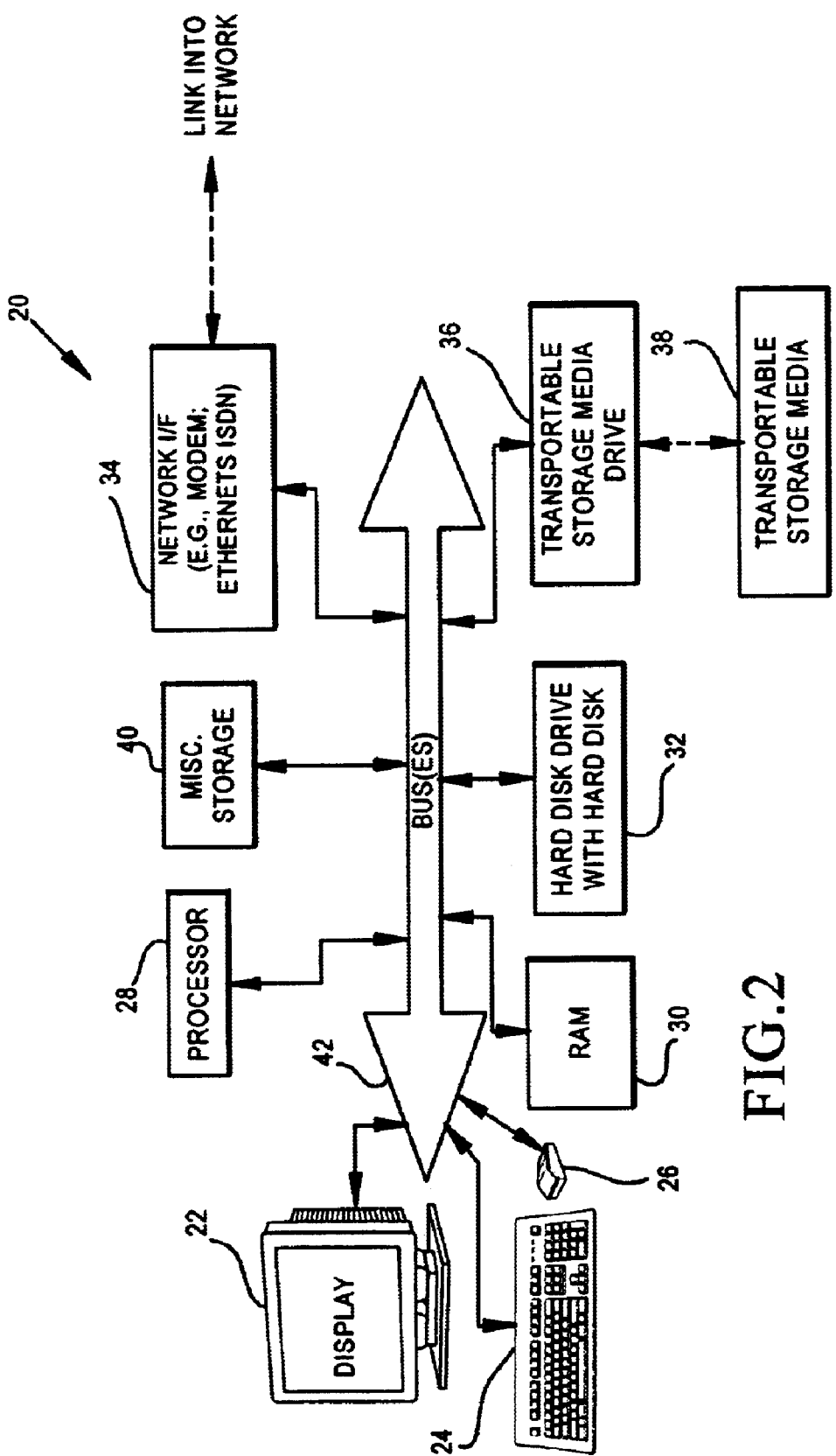
FIG. 2 is a block diagram of an exemplary host computing system for the interactive processing environment of FIG. 1.

In one embodiment the interactive processing environment 10 is implemented on a programmed digital computer of the type which is well known in the art, an example of which is shown in FIG. 2. A computer system 20 has a display 22, a key entry device 24, a pointing/clicking device 26, a processor 28, and random access memory (RAM) 30. In addition there commonly is a communication or network interface 34 (e.g., modem; ethernet adapter), a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more buses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer, a networked client computer or a stand alone computer. The computer system 20 may even be configured as a workstation, personal computer, or a reduced-feature network terminal device.

In another embodiment the interactive processing environment 10 is implemented in an embedded system. The embedded system includes similar digital processing devices and peripherals as the programmed digital computer described above. In addition, there are one or more input devices or output devices for a specific implementation, such as image capturing.

Software code for implementing the user interface 12 and shell environment 14, including computer executable instructions and computer readable data are stored on a digital processor readable storage media, such as embedded memory, RAM, ROM, a hard disk, an optical disk, a floppy disk, a magneto-optical disk, an electro-optical disk, or another known or to be implemented transportable or non-transportable processor readable storage media. Similarly, each one of the plug-ins 16 and the corresponding API 18, including digital processor executable instructions and processor readable data are stored on a processor readable storage media, such as embedded memory, RAM, ROM, a hard disk, an optical disk, a floppy disk, a magneto-optical disk, an electro-optical disk, or another known or to be implemented transportable or non-transportable processor readable storage media. The plug-ins 16 (with the corresponding API 18) may be bundled individually on separate storage media or together on a common storage medium. Further, none, one or more of the plug-ins 16 and the corresponding API's 18 may be bundled with the user interface 12 and shell environment 14. Further, the various software programs and plug-ins may be distributed or executed electronically over a network, such as a global computer network.

Under various computing models, the software programs making up the processing environment 10 are installed at an end user computer or accessed remotely. For stand alone computing models, the executable instructions and data may be loaded into volatile or non-volatile memory accessible to the stand alone computer. For non-resident computer models, the executable instructions and data may be processed locally or at a remote computer with outputs routed to the local computer and operator inputs received from the local computer. One skilled in the art will appreciate the many computing configurations that may be implemented. For non-resident computing models, the software programs may be stored locally or at a server computer on a public or private, local or wide area network, or even on a global computer network. The executable instructions may be run either at the end user computer or at the server computer with the data being displayed at the end user's display device.

Shell Environment and User Interface

The shell environment 14 allows an operator to work in an interactive environment to develop, test or use various video processing and enhancement tools. In particular, plug-ins for video object segmentation, video object tracking, morphological processing and video encoding (e.g., compression) are supported in a preferred embodiment. The interactive environment 10 with the shell 14 provides a useful environment for creating video content, such as MPEG-4 video content or content for another video format. A pull-down menu or a pop up window is implemented allowing an operator to select a plug-in to process one or more video frames.

In one embodiment the shell 14 includes a video object manager. A plug-in program 16, such as a segmentation program accesses a frame of video data, along with a set of user inputs through the shell environment 14. A segmentation plug-in program identifies a video object within a video frame. The video object data is routed to the shell 14 which stores the data within the video object manager module. Such video object data then can be accessed by the same or another plug-in 16, such as a tracking program. The tracking program identifies the video object in subsequent video frames. Data identifying the video object in each frame is routed to the video object manager module. In effect video object data is extracted for each video frame in which the video object is tracked. When an operator completes all video object extraction, editing or filtering of a video sequence, an encoder plug-in 16 may be activated to encode the finalized video sequence into a desired format. Using such a plug-in architecture, the segmentation plug-in, tracking plug-in and morphological plug-in do not need to interface to the encoder plug-in. Further, such plug-ins do not need to support reading of several video file formats or create video output formats. The shell handles video input compatibility issues, while the user interface handles display formatting issues. The encoder plug-in handles creating a run-time video sequence.

For a Microsoft Windows operating system environment, the plug-ins 16 are compiled as dynamic link libraries. At processing environment 10 run time, the shell 14 scans a predefined directory for plug-in programs. When present, a plug-in program name is added to a list which is displayed in a window or menu for user selection. When an operator selects to run a plug-in 16, the corresponding dynamic link library is loaded into memory and a processor begins executing instructions from one of a set of pre-defined entry points for the plug-in. To access a video sequence and video object segmentations, a plug-in uses a set of callback functions. A plug-in interfaces to the shell program 14 through a corresponding application program interface module 18.

In addition, there is a segmentation interface 44 portion of the user interface 12 which is supported by a segmentation plug-in. The segmentation interface 44 makes calls to a segmentation plug-in to support. operator selected segmentation commands (e.g., to execute a segmentation plug-in, configure a segmentation plug-in, or perform a boundary selection/edit).

The API's 18 typically allow the corresponding plug-in to access specific data structures on a linked need-to-access basis only. For example, an API serves to fetch a frame of video data, retrieve video object data from the video object manager, or store video object data with the video object manager. The separation of plug-ins and the interfacing through API's allows the plug-ins to be written in differing program languages and under differing programming environments than those used to create the user interface 12 and shell 14. In one embodiment the user interface 12 and shell 14 are written in C++. The plug-ins can be written in any language, such as the C programming language.

In a preferred embodiment each plug-in 16 is executed in a separate processing thread. As a result, the user interface 12 may display a dialog box that plug-ins can use to display progress, and from which a user can make a selection to stop or pause the plug-in's execution.

Referring again to FIG. 1, the user interface 12 includes the segmentation interface 44 and various display windows 54–62, dialogue boxes 64, menus 66 and button bars 68, along with supporting software code for formatting and maintaining such displays. In a preferred embodiment the user interface is defined by a main window within which a user selects one or more subordinate windows, each of which may be concurrently active at a given time. The subordinate windows may be opened or closed, moved and resized.

In a preferred embodiment there are several subordinate windows 52, including a video window 54, a zoom window 56, a time-line window 58, one or more encoder display windows 60, and one or more data windows 62. The video window 54 displays a video frame or a sequence of frames. For viewing a sequence of frames, the frames may be stepped, viewed in real time, viewed in slow motion or viewed in accelerated time. Included are input controls accessible to the operator by pointing and clicking, or by predefined key sequences. There are stop, pause, play, back, forward, step and other VCR-like controls for controlling the video presentation in the video window 54. In some embodiments there are scaling and scrolling controls also for the video window 54.

The zoom window 56 displays a zoom view of a portion of the video window 54 at a substantially larger magnification than the video window. The time-line window 58 includes an incremental time-line of video frames, along with zero or more thumb nail views of select video frames. The time line window 58 also includes a respective time-line for each video object defined for the input video sequence 11. A video object is defined by outlining the object.

The data window 62 includes user-input fields for an object title, translucent mask color, encoding target bit rate, search range and other parameters for use in defining and encoding the corresponding video object.

During encoding one of the encoder windows 60 is displayed. For example, an encoder progress window shows the encoding status for each defined video object in the input video sequence 11.

Video Object Tracking and Segmentation

Figure 3:
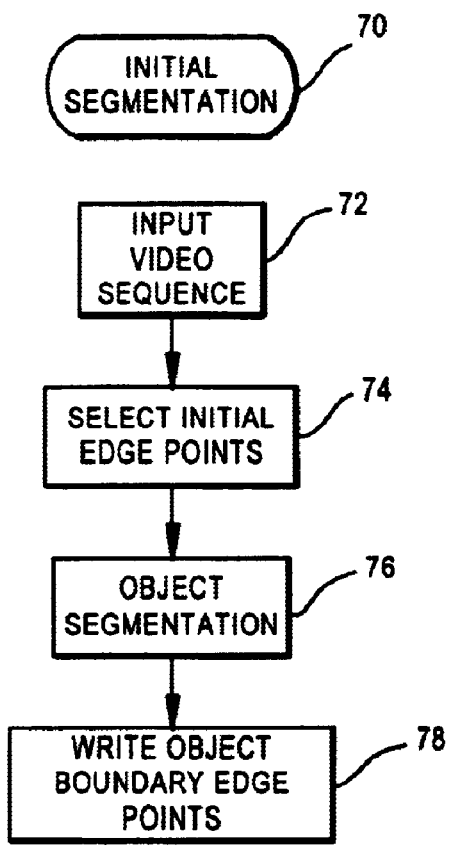
FIG. 3 is a flow chart for a segmentation process for initially selecting and segmenting an object to be tracked.

To track an object, the first step is to define a template to use which corresponds to the object. FIG. 3 is a flow chart 70 for initially segmenting a video object according to an embodiment of this invention to achieve an initial template. In one embodiment an operator loads in an input video sequence at step 72, and selects points or line segments approximating a boundary of the object at step 74. A segmentation then is applied at step 76 to more accurately define the boundary. The segmentation is performed using any of various segmentation techniques. For example, a segmentation technigue is described in commonly-assigned U.S. patent application Ser. No. 09/323,501 filed Jun. 10, 1999 naming Sun et al. titled, "Video Object Segmentation Using Active Contour Model with Global Relaxation," incorporated herein by reference and made a part hereof. Therein, an active contour model is described for segmenting a curve to comply to an object.

The edge points which define the object boundary are output at step 78. Such edge points are used as control points for another plug-in, such as to define and overlay an object mask (i.e., template) onto the image frame to visually distinguish the object being tracked. Also, the operator may adjust points on the boundary to refine the boundary, and re-execute the segmentation algorithm using the refined boundary points to achieve a desired and accurate object. Such object serves as an initial template for locating the object in another frame.

In a preferred embodiment, the located object in a given frame serves as the initial template when searching for the object in the next frame to be processed. Such next frame may be the succeeding image frame in the video sequence, or the next frame to be sampled in the video sequence, or any other frame, either in sequence or out of sequence, which is the next frame to be processed. According to such approach the initial template is always changing for each frame to be processed.

Figure 4:
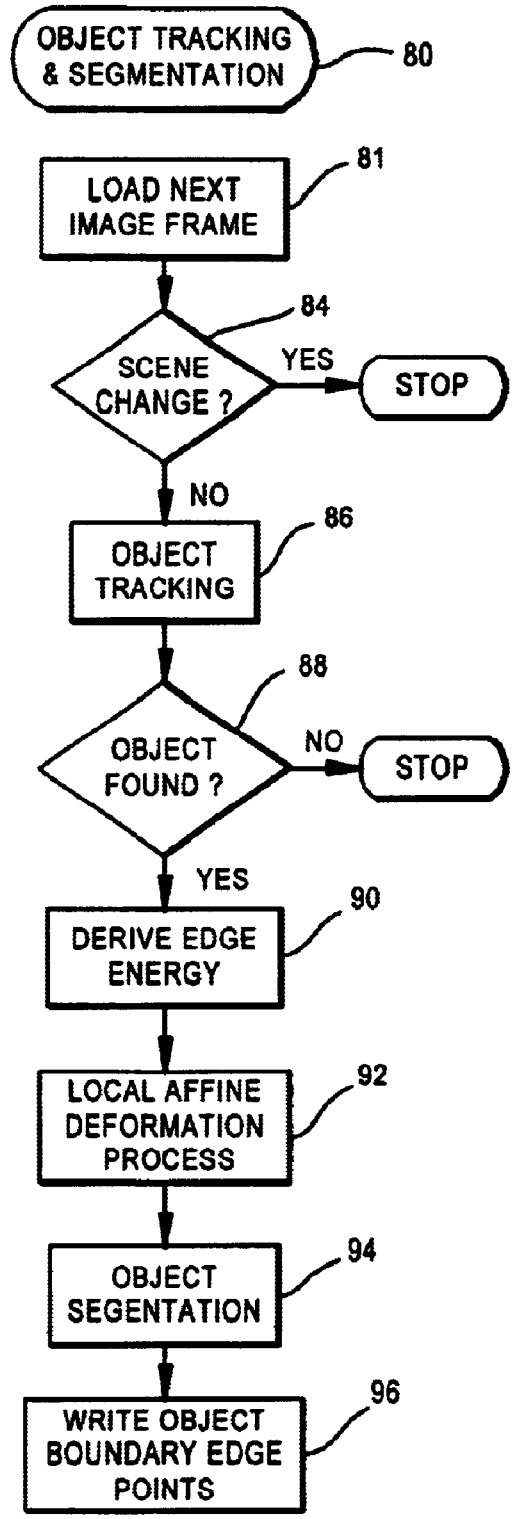
FIG. 4 is a flow chart of an object tracking and segmentation method according to an embodiment of this invention.

FIG. 4 is a flow chart 80 for tracking an object in subsequent frames following identification and segmentation of the object in an initial frame. At step 81 the next image frame to be processed is input. At step 84 testing is performed to identify whether there has been a scene change. Although various approaches may be implemented, in one embodiment a modified applied resonance theory M-ART2 method is performed as described in commonly-assigned U.S. patent application Ser. No. 09/323,501 filed Jun. 10, 1999 naming Sun et al. titled, "Video Object Segmentation Using Active Contour Model with Global Relaxation," incorporated herein by reference and made a part hereof.

If a scene change is detected at step 84, then the process 80 is complete, or is re-initialized to track another image object. If a scene change has not occurred, then the image object is coarsely identified from the image frame at step 86, using any of various object tracking techniques. In one embodiment a two-dimensional correlative auto-predictive search (2D-CAPS) process is performed. In another embodiment a three-dimensional correlative auto-predictive search (3D-CAPS) process is performed. If at step 88 the image object is not found using the 2D-CAPS process, then the process 80 terminates or re-initializes for tracking another object.

If the object is identified, then the edge energy for the object boundary is derived at step 90. An edge-based local affine deformation process then is performed at step 92 to better track objects which have irregular movement patterns (e.g., portions that move in a different manner than other portions of the object). The edge energy derived at step 90 is used by the local affine deformation process to better track movements within local regions of the object.

At step 94 an object segmentation process is performed, such as the segmentation process described above regarding step 76. In one embodiment an active contour model is applied to segment the image boundary of the entire object and accurately model the object boundary. The local affine deformation process provides more reliable indications of the local deformation of the boundary allowing the active contour model to estimate a more accurate boundary for the entire object. At step 96 the estimated image boundary is output. As described above for the initial image frame, in some embodiments the output is written to a buffer, a file, and/or to a video screen. The process 80 then repeats for another image frame. As a result, an image object is segmented and tracked over many image frames.

Edge Energy

Edge energy is a measure of the potential energy of a set of image pixels which identifies an edge based upon the relative energy values of pixels. Various measures of potential energy may be implemented. In one embodiment a multiple level wavelet decomposition algorithm is used to extract high frequency components of an image. The high frequency details are analyzed to identify image object edges. For example, a Haar wavelet may be used.

The input to be processed to derive edge potential energy is an image. In one embodiment the image is the entire image frame. In other embodiments, the image is an image object. The derived edge potential energy is an array of potential energy for each data point (pixel) of the image.

Figure 5:
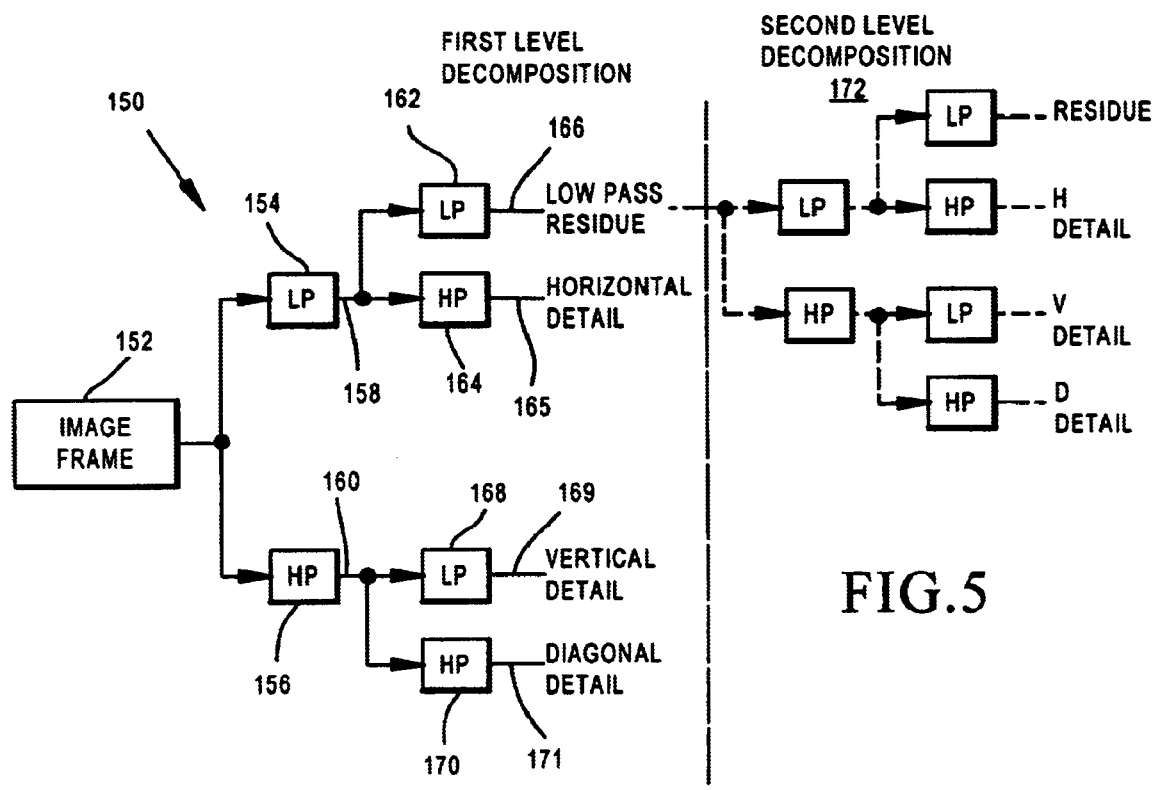
FIG. 5 is a diagram of a quadrature modelling filter for decomposing an image to achieve detailing images and a low pass residue.

In one embodiment the input image is decomposed by filtering the image with a quadrature mirror filter (QMF) pair which brings out the image details, while simultaneously smoothing the image. The QMF pair includes a high pass filter for bringing out the image details, and a low pass filter for smoothing the image. Referring to FIG. 5 a multiple level QMF decomposition 150 of an image frame 152 is shown. The image frame 152 is passed through a low pass filter 154 and a high pass filter 156 to obtain a low pass component 158 and a high pass component 160. These components, in turn, are filtered. The low pass component 158 is passed through a low pass filter 162 and a high pass filter 164. The output of low pass filter 162 is lowpass residue 166. The output of high pass filter 164 is the horizontal detail 165 of the image frame 152.

In parallel, the high pass component 160 is passed through a low pass filter 168 and a high pass filter 170. The output of the low pass filter 168 is the vertical detail 169 of the image frame 152. The output of the high pass filter 170 is the diagonal detail 171 of the image frame 152. The low pass residue 166 and the three detailing images 165, 169, 171 are the first level QMF decomposition of the image frame 152. In some embodiments a second level QMF decomposition 172 also is performed in which the low pass residue 166 is input similarly through two stages of low pass and high pass filters to achieve a second-level, low-pass residue and three detailing images (horizontal detail, vertical detail and diagonal detail). In some embodiments the same filters may be used in the second level decomposition as were used in the first level decomposition. for example, the low pass residue 166 is merely input to filters 154, 156 instead of the image frame 152.

The high pass filtering function is a wavelet transformation ($\psi$), while the low pass filtering function is a scaling function ($\phi$) corresponding with the wavelet. The scaling function causes smoothing, while the three wavelets bring out the image details. The scaling function and wavelet transforms in one dimensional space are given by the equations below:

$$\phi_{a,b}(x) = \frac{1}{\sqrt{a}}\phi\left(\frac{x-b}{a}\right), \quad a > b, b \in R$$

$$\psi_{a,b}(x) = \frac{1}{\sqrt{a}}\psi\left(\frac{x-b}{a}\right), \quad a > 0, b \in R$$

where, $\phi_{a,b}(x)$ is the family of scaling function at scale a and translated by b;

$\psi_{a,b}(x)$ is the family of wavelets at scale a and translated by b;

a is the scaling factor;

b is the translation desired $\phi$ is $\phi_{0,0}$; and $\psi$ is $\psi_{0,0}$.

Two dimensional wavelets are defined as tensor products of the one-dimensional wavelets. The two-dimensional scaling function is $\phi(x,y)=\phi(x)*\phi(y)$. The two-dimensional wavelets are:

$$\psi_1(x,y)=\phi(x)*\psi(y)$$
$$\psi_2(x,Y)=\phi(y)*\psi(x)$$
$$\psi_3(x,y)=\psi(x)*\psi(y)$$

Although the scaling may be varied from one level of decomposition to another, in one embodiment such scaling is not varied.

A first level QMF decomposition is performed. For a second level decomposition the low pass residue 166 of the first level decomposition is analyzed without further downsampling. In some embodiments additional levels of decomposition may be obtained by passing the low pass residue of the prior level through a two stage filtering process (similar to that for the prior levels).

For any given level of decomposition there are four images: the low pass residue, the vertical detail, the horizontal detail and the diagonal detail. The horizontal and vertical detail are gradients of the image along x and y axes. The magnitude of the image is taken at every level of decomposition. The diagonal details have been omitted in one embodiment, because they did not contribute significantly.

In one embodiment up to five levels of decomposition are used for each color component of the image frame, in which the low pass residue from the prior stage is input to the filters 154, 156 to generate image details and residue for the current stage. Preferably, only data from the even levels (e.g., levels 2, 4, and 6) are used to avoid half-pixel shifts in the edge energy. The integration of the multiple levels and multiple channel (color component) data is guided by their principal component. In one implementation the ratio of multiple-level edge gradients is selected as 1:2:4:8:16 for the five levels of decomposition. With respect to the color components (Y, Cr, Cb), edge gradient ratios of 1:1:1 are used.

In one embodiment the horizontal detail and vertical detail of a given level (i) of decomposition are combined to generate the edge potential energy (EPE) for that level as follows:

$$EPE(i)=\text{sqrt }[\text{horizontal detail}^2(i)+\text{vertical detail}^2(i)]$$

where i=i-th level of decomposition.
For an embodiment in which 5 levels of decomposition are executed, the total edge potential energy (EPE) for a given color component are summed together:

$$EPE_c=EPE_c(2)+2*EPE_c(4)+4*EPE_c(6)+8*EPE_c(8)+16*EPE_c(10)$$

where c is the color component being processed.
The overall edge potential energy for the entire frame, inclusive of all color components is the weighted sum of the energy from the different color components. For a weighting factor of (1, 1, 1) the total potential energy is given by:

$$\text{Total Edge Potential Energy}=EPE_Y+EPE_{Cr}+EPE_{Cb}$$

where Y, Cr and Cb are the color components. In other embodiments R,G and B color components or those of another color component model may be used. The weighting factor may vary depending on the color components model being used.

The total edge potential energy is an array having an energy value for each pixel of the image processed. Although a detailed description of an edge energy derivation is described, alternate methods of deriving edge energy may be used.

Local Affine Deformation

Figure 6:
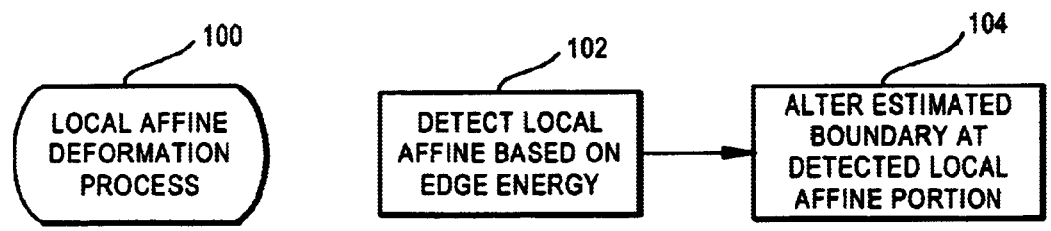
FIG. 6 is a flow chart of a local affine deformation process according to an embodiment of this invention.

To better estimate an object boundary a local deformation of the object is automatically determined based upon edge information for an image frame. The edge information is derived in one embodiment as described above in the section, Edge Energy. FIG. 6 shows a flow chart of the local affine deformation process 100. At a first step 102 a deformation, if present, of a contour in an image frame is detected as a local affine. To detect a local affine deformation the edge energy for a contour points in a current frame are compared to the energy for the corresponding contour points of a previous frame. The contour points are the control points of the object boundary coarsely estimated at the object tracking step 86. The edge energy difference is analyzed to identify local deformations of the object. In some embodiments the processing burden for such task is reduced by subsampling the contour points, depending on the expected smoothness of a curve. The edge energy change ratio (R) from the previous frame ($f^{-1}$) to the current frame (f) for a given contour point (i) is defined in one embodiment as:

$$R_i^f = \frac{\sum_{k=i-n}^{k=i+n} |E_k^f - E_k^{f-1}|}{\sum_{k=i-n}^{k=i+n} E_k^{f-1}}$$

where, $E_k^f$ is the edge energy for contour point k in image frame f; and $E^{f-1}{}_k$ is the edge energy for contour point k in image frame f-1.

n is the number of neighboring contour points to consider on each side. Thus, the window size is 2n+1 contour points.

Figure 7:
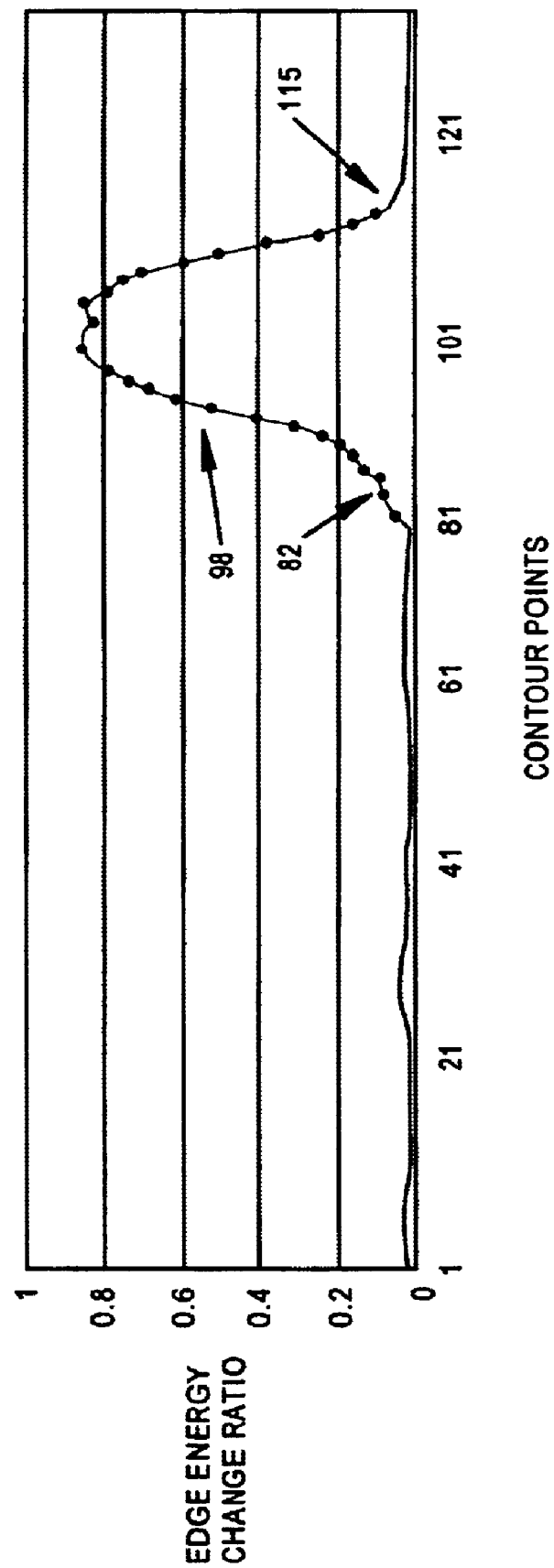
FIG. 7 is a plot of edge energy change ratio for contour points of a coarsely estimated object boundary.

To identify local deformations the edge energy change ratio is tested against a threshold. Referring to FIG. 7 an example of the edge energy change ratio is plotted for a given set of contour points within an image frame. For a threshold level of 0.1, a local deformation is detected as a curve 98 formed by contour points 83 through 110. In different embodiments, differing threshold levels may be implemented. To identify the entire local deformation identified curve (e.g., points 83–110) is expanded in a backward direction and a forward direction. Specifically, the curve is extended backward from back-end contour point (e.g., point 83 in the FIG. 7 example) until the edge energy change ratio for preceding contour points no longer changes continuously. Similarly, the curve is extended forward from frontend contour point (e.g., point 110 in the FIG. 7 example) until the edge energy change ratio for following contour points no longer changes continuously. In the example illustrated the local deformation curve is refined to extend from contour point 82 to contour point 115.

At another step 104 the object boundary is altered at the detected local affine deformation. The segment of the object boundary for example is warped to better estimate the changed boundary of the object being tracked by implementing a transform function. In one embodiment a given point (x,y) on the coarsely estimated object boundary is transformed to a point (x',y') as follows:

$$\begin{bmatrix} x' \\ y' \end{bmatrix} = \begin{bmatrix} a_{10} \\ a_{20} \end{bmatrix} + \begin{bmatrix} a_{11} & a_{12} \\ a_{21} & a_{22} \end{bmatrix} \cdot \begin{bmatrix} x \\ y \end{bmatrix}$$

where $\{a_{ij} | i=1,2; j=0,1,2\}$ are a set of parameters. In one embodiment a gradient descent algorithm is implemented to determine the parameter values.

Gradient Descent Search Strategy

Figure 8:
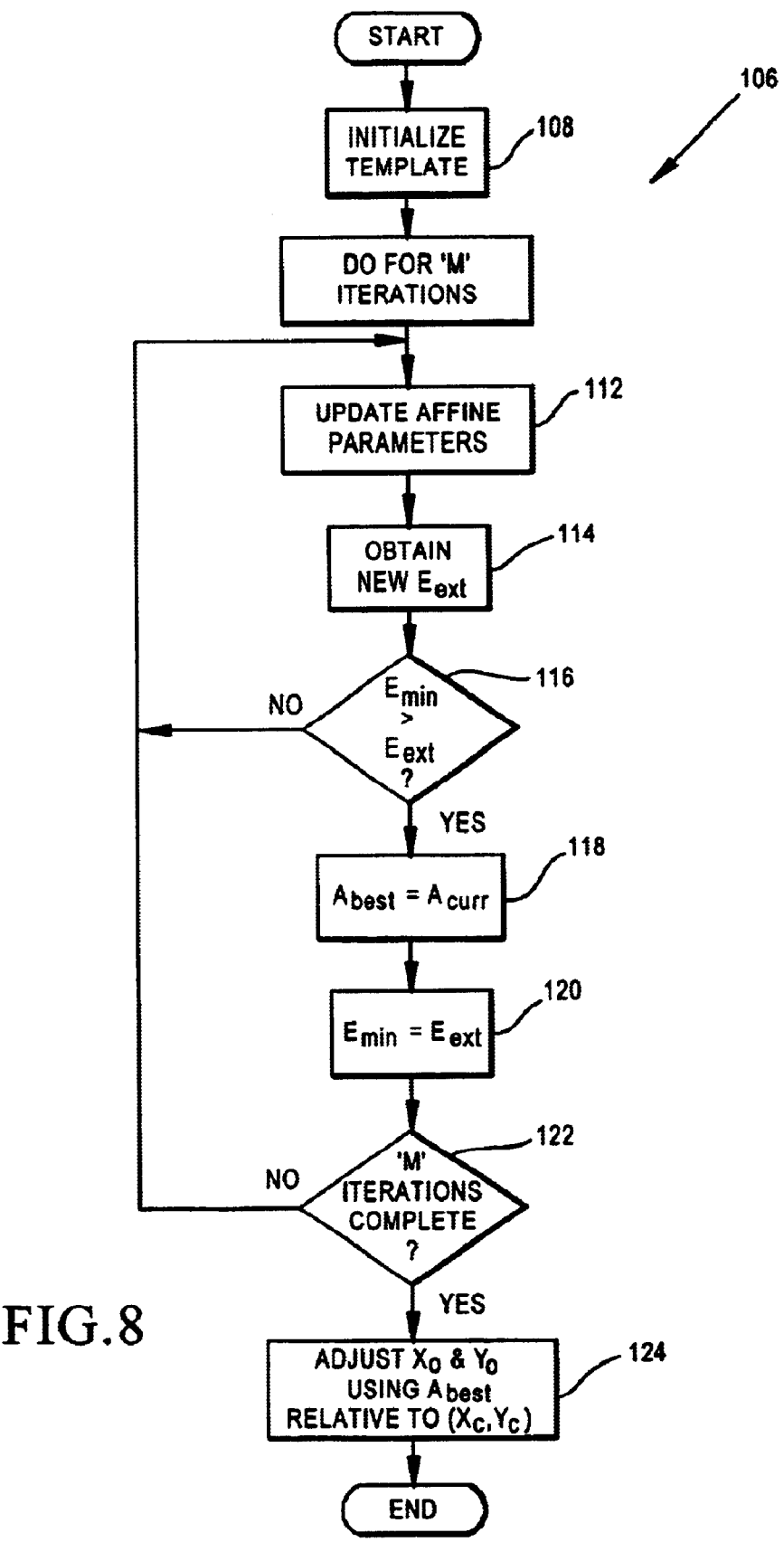
FIG. 8 is a flow chart of a gradient descent strategy for applying affine deformations to a template to estimate location of a local affine in a given image frame.

Referring to FIG. 8, a flow chart 106 of the gradient descent search process is shown. At step 108 the template is initialized for the search. The template is the first deformed template when performing a global affine deformation process, and is a select sub-portion of the second deformed template when performing a local affine deformation process. The select sub-portion is the local area upon which the affine transformation is to be applied.

For each given frame N, it is assumed that each pixel coordinate (x, y) undergoes affine motion according to the equation:

$$\begin{bmatrix} x' \\ y' \end{bmatrix} = \begin{bmatrix} a_{11} & a_{12} \\ a_{21} & a_{22} \end{bmatrix} \begin{bmatrix} x \\ y \end{bmatrix} + \begin{bmatrix} t_x \\ t_y \end{bmatrix}$$

where x' and y' represent the template coordinates in frame N+1, the matrix with elements $a_{ij}$ defines scaling, rotation, and shearing of the point (x, y), and $t_x$ and $t_y$ (replacing $a_{10}$ and $a_{20}$) provide translation.

Six affine parameters ($a_{11}$, $a_{12}$, $a_{21}$, $a_{22}$, $t_x$, $t_y$) define the parameter space for a local template. The affine deformation is performed in a steepest gradient descent in the parameter space by evaluating the template using the external energy image E. For example, using the chain rule, the equation below is derived, which advances $a_{11}$ by one iteration using a step size h:

$$a_{11}(n+1) = a_{11}(n) - h_a \frac{\partial E}{\partial a_{11}(n)} = a_{11}(n) - h_a \left(\frac{\partial E}{\partial x'}\right)^T \frac{\partial x'}{\partial a_{11}(n)}$$

$$= a_{11}(n) - h_a \left(\frac{\partial E}{\partial x'}\right)^T x \cong a_{11}(n) - h_a \left(\frac{\partial E}{\partial x'(n)}\right)^T x$$

where E is the energy, $h_a$ is the step size, n is the current iteration, and x, y and x',y' are the old and new positions due to the affine transformation. Similar equations, as follows, are derived for the other parameters:

$$a_{12}(n+1) \cong a_{12}(n) - h_a \left(\frac{\partial E}{\partial x'(n)}\right)^T y$$

$$a_{21}(n+1) \cong a_{21}(n) - h_a \left(\frac{\partial E}{\partial y'(n)}\right)^T x$$

$$a_{22}(n+1) \cong a_{22}(n) - h_a \left(\frac{\partial E}{\partial y'(n)}\right)^T y$$

$$t_x(n+1) \cong t_x(n) - h_t \left(\frac{\partial E}{\partial x'(n)}\right)^T \cdot T$$

$$t_y(n+1) \cong t_y(n) - h_t \left(\frac{\partial E}{\partial y'(n)}\right)^T \cdot T$$

In the equations above, x represents the column vector of x coordinates for the entire contour (for global deformation) or a portion of the contour (for local deformation), and $\partial E/\partial x'(n)$ is the column vector containing the horizontal component of the gradient of the energy image at the boundary pixels. The energy image gradient is estimated using the central difference kernel [−1, 0, 1].

To initialize the template, the mean values, $x_c'$ and $y_c'$ are removed from the template vectors $x_0$ and $y_0$ and stored in x, y. Further the template centroid is stored ($x_c'$, $y_c$). In addition, the parameters are set as follows to define an initial 2×2 identity matrix and zero translation: $a_{11}=a_{22}=1$; $a_{12}=a_{21}=0$; $t_x=0$; $t_y=0$.

In a preferred embodiment the gradient descent search is performed in two stages. In a first stage, a fixed number of iterations are performed using different fixed step sizes for the $a_{ij}$ and translation parameters. In one embodiment a ratio $h_t/h_a=1500$ is used to ensure translation. In this first stage, the step sizes $h_t$ and $h_a$ are scaled inversely proportional to the number of points in the template. For example, $h_t \propto 1/n$ and $h_a \propto 1/n$, where N is the number of points in the template. The step sizes are adjusted relative to the magnitude of the energy image, so in some embodiments empirical testing is performed. The gradient of the energy determines the direction of the step taken in the parameter space. However, due to the fixed step size, the template energy may increase or decrease between iterations, enabling the algorithm to climb hills to reach lower energy minima.

After updating the affine parameters in step 112 according to the equations above, the new external energy is calculated at step 114 by summing the energy values at the new boundary points. At step 116 the minimum energy $E_{min}$ is compared to the new external energy, $E_{ext}$. If the minimum energy is greater than the external energy, then at step 118 the set $A_{curr}$, of current affine parameters becomes the best set, $A_{best}$, of affine parameters. Also, at step 120 the minimum energy is set to the external energy. The process steps 112 through 120 are repeated for m iterations, where m is a prescribed value, and may vary by design. During an iteration, if the minimum energy is not greater than the external energy, the minimum energy value is not updated and the set of best affine parameters is not changed. At step 122, the iteration count is tested. If m iterations have not been completed then a new iteration commences. If the m iterations have completed, the set of best affine parameters, $A_{best}$, is used at step 124 to adjust the template border. Specifically, the current pixel values, $x_0$, $y_0$, are updated using the set of best affine parameters relative to the centroid value $x_c$, $y_c$.

The affine parameters describing the template with the lowest energy encountered during the first search stage are used to initialize the next stage. Such a gradient-guided search method is effective at finding the appropriate local energy minimum on the complex parametric surface.

The second stage includes a line search in the direction of the steepest gradient. On each iteration, an initial step size of 1.0 and an initial vector of $$(\hat{a}_{11}, \hat{a}_{12}, \hat{a}_{21}, \hat{a}_{22}, \hat{t}_x, \hat{t}_y) = \left( \frac{0.1 \cdot \frac{\partial E}{\partial a_{11}(n)} \cdot x}{\|\nabla G_a\|}, \frac{0.1 \cdot \frac{\partial E}{\partial a_{12}(n)} \cdot y}{\|\nabla G_a\|}, \right.$$

$$\left. \frac{0.1 \cdot \frac{\partial E}{\partial a_{21}(n)} \cdot x}{\|\nabla G_a\|}, \frac{0.1 \cdot \frac{\partial E}{\partial a_{22}(n)} \cdot y}{\|\nabla G_a\|}, \frac{2 \cdot \frac{\partial E}{\partial t_x(n)} \cdot T}{\|\nabla G_t\|}, \frac{2 \cdot \frac{\partial E}{\partial t_y(n)} \cdot T}{\|\nabla G_t\|} \right)$$

are used by the line search, where $\|\nabla G_a\|$ and $\|\nabla G_1\|$ are the maximum gradient magnitudes over the past and current iterations for the four $a_{ij}$ and two translation parameters, respectively. Once the direction of descent is selected, the line search finds K, the magnitude of the step to be taken in the direction of the gradient. typically, the line search produces a value K between 0 and 1. The affine parameters are then updated according to the following equations:

$$a_{ij}(n+1) = a_{ij}(n) - K \cdot \hat{a}_{ij};$$

$$t_x(n+1) = t_x(n) - K \cdot \hat{t}_x$$

$$t_y(n+1) = t_y(n) - K \cdot \hat{t}_y$$

In one embodiment the line search uses a line minimization function. The second stage is represented in a do while loop as follows:

Do{
   calculate new gradient direction
   execute line search
   update affine parameters $$\begin{bmatrix} x^* \text{ key} \\ y^* \text{ key} \end{bmatrix} = \begin{bmatrix} a_{10} \\ a_{20} \end{bmatrix} + \begin{bmatrix} a_{11} & a_{12} \\ a_{21} & a_{22} \end{bmatrix} \cdot \begin{bmatrix} x \text{ key} \\ y \text{ key} \end{bmatrix}$$

For each candidate point (x* key, y* key), there is a unique solution for the parameter set $\{a_{ij} \,|\, i=1,2; j=0,1,2\}$, as follows:

$$a_{10} = \frac{(-x^* \text{ key} + x \text{ key}) \cdot (x \text{ front} \cdot y \text{ back} - x \text{ back} \cdot y \text{ front})}{-x \text{ front} \cdot y \text{ back} + x \text{ key} \cdot y \text{ back} + x \text{ back} \cdot y \text{ front} - x \text{ key} \cdot y \text{ front} - x \text{ back} \cdot y \text{ key} + x \text{ front} \cdot y \text{ key}}$$

$$a_{20} = \frac{(-y^* \text{ key} + y \text{ key}) \cdot (-x \text{ front} \cdot y \text{ back} + x \text{ back} \cdot y \text{ front})}{x \text{ front} \cdot y \text{ back} - x \text{ key} \cdot y \text{ back} - x \text{ back} \cdot y \text{ front} + x \text{ key} \cdot y \text{ front} + x \text{ back} \cdot y \text{ key} - x \text{ front} \cdot y \text{ key}}$$

$$a_{11} = \frac{(x^* \text{ key} - x \text{ key}) \cdot (-y \text{ back} + y \text{ front})}{x \text{ front} \cdot y \text{ back} - x \text{ key} \cdot y \text{ back} - x \text{ back} \cdot y \text{ front} + x \text{ key} \cdot y \text{ front} + x \text{ back} \cdot y \text{ key} - x \text{ front} \cdot y \text{ key}}$$

$$a_{12} = \frac{(-x^* \text{ key} + x \text{ key}) \cdot (x \text{ back} - x \text{ front})}{-x \text{ front} \cdot y \text{ back} + x \text{ key} \cdot y \text{ back} + x \text{ back} \cdot y \text{ front} - x \text{ key} \cdot y \text{ front} - x \text{ back} \cdot y \text{ key} + x \text{ front} \cdot y \text{ key}}$$

$$a_{21} = \frac{(-y^* \text{ key} + y \text{ key}) \cdot (y \text{ back} - y \text{ front})}{x \text{ front} \cdot y \text{ back} - x \text{ key} \cdot y \text{ back} - x \text{ back} \cdot y \text{ front} + x \text{ key} \cdot y \text{ front} + x \text{ back} \cdot y \text{ key} - x \text{ front} \cdot y \text{ key}}$$

$$a_{22} = \frac{x \text{ front} \cdot y \text{ back} - x \text{ key} \cdot y \text{ back} - x \text{ back} \cdot y \text{ front} + x \text{ key} \cdot y \text{ front} + x \text{ back} \cdot y^* \text{ key} - x \text{ front} \cdot y^* \text{ key}}{x \text{ front} \cdot y \text{ back} - x \text{ key} \cdot y \text{ back} - x \text{ back} \cdot y \text{ front} + x \text{ key} \cdot y \text{ front} + x \text{ back} \cdot y \text{ key} - x \text{ front} \cdot y \text{ key}}$$

} While E(n+1)−E(n)<0 (i.e., while the energy is decreasing)

Key Point Search Strategy

In a preferred embodiment, rather than use a gradient descent search strategy an alternative strategy is used. With a key point search strategy as discussed below, the local affine is always connected to the whole contour by front point and back points. In the key point search strategy the parameters $\{a_{ij} \,|\, i=1,2; j=0,1,2\}$ are derived using six independent linear equations. For such approach it is assumed that two end points of the detected local affine do not change much, (i.e., their change is similar to that for the main object from which the local affine stems). It is assumed that the deformation of the local affine occurs between these two end points—the front contour point and the back contour point. As a result, the six equations for the six parameters are reduced to 4 independent equations, as follows:

$$\begin{bmatrix} x \text{ front} \\ y \text{ front} \end{bmatrix} = \begin{bmatrix} a_{10} \\ a_{20} \end{bmatrix} + \begin{bmatrix} a_{11} & a_{12} \\ a_{21} & a_{22} \end{bmatrix} \cdot \begin{bmatrix} x \text{ front} \\ y \text{ front} \end{bmatrix}$$

$$\begin{bmatrix} x \text{ back} \\ y \text{ back} \end{bmatrix} = \begin{bmatrix} a_{10} \\ a_{20} \end{bmatrix} + \begin{bmatrix} a_{11} & a_{12} \\ a_{21} & a_{22} \end{bmatrix} \cdot \begin{bmatrix} x \text{ back} \\ y \text{ back} \end{bmatrix}$$

To further reduce the number of equations a key contour point on the local affine is selected. From step 102 the contour points allocated to the local affine have been identified. One of the contour points other than the front point and the back point is selected as the key point. The key point is selected as the contour point farthest from both the front point and the back point. A total distance, d, is derived for each contour point, i, as follows:

$$d = |(x_i, y_i) - (x_{front}, y_{front})| + |(x_j, y_j) - (x_{back}, y_{back})|$$

Figure 9:
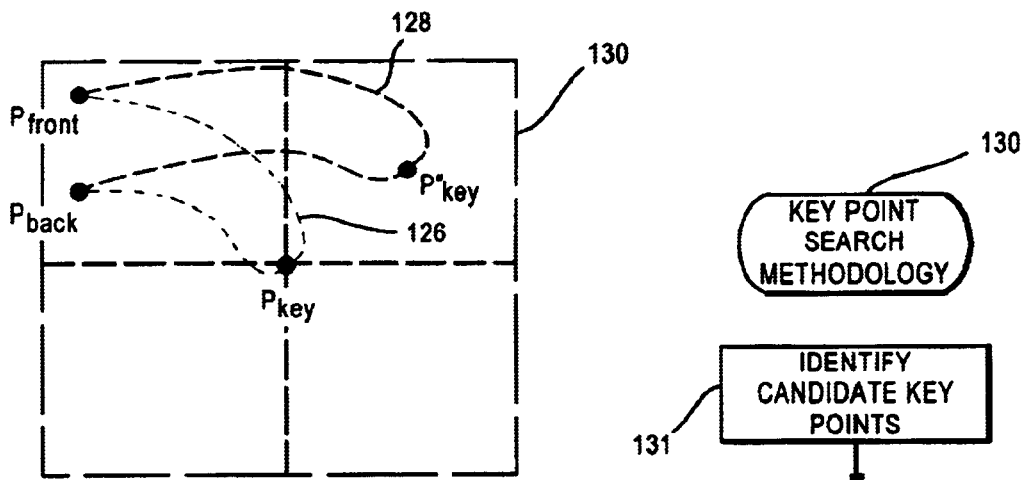
FIG. 9 is a plot of a search window for selecting an optimal key point.

With a key point selected as being on the actual local affine, we are closer to defining the parameters for the equation of the affine. For every possible match point of the contour key point, there exists a pair of independent equations as follows:

With $(x_{key}, y_{key})$ known from the distance measure, and with $(x_{front}, y_{front})$ and $(x_{back}, y_{back})$ known as the end points of the local affine, the best candidate point $(x^*_{key}, y^*)$ is to be determined by searching for an optimal match point. Referring to FIG. 9, the search problem is illustrated. Curve 126 is the local affine as predicted by the coarse object tracking of step 86. Curve 128 is the local affine of the object which is being modelled. The points $P_{front}$ and $P_{back}$ are the front and back points of the local affine as detected at step 102. The point $P_{key}$ is the location of the key point based upon the object tracking of step 86.

The problem is to derive a method of accurately predicting the location of the key point $P^*_{key}$ on the actual curve 128 so that the actual curve 128 can be predicted. Key point $P^*_{key}$ is one candidate point among many evaluated. A search window 130 with the initial key point $P_{key}$ at the center can vary according to the embodiment. A window height and width is selected based on the total distance calculated above for contour point $P_{key}$.

Figure 10:
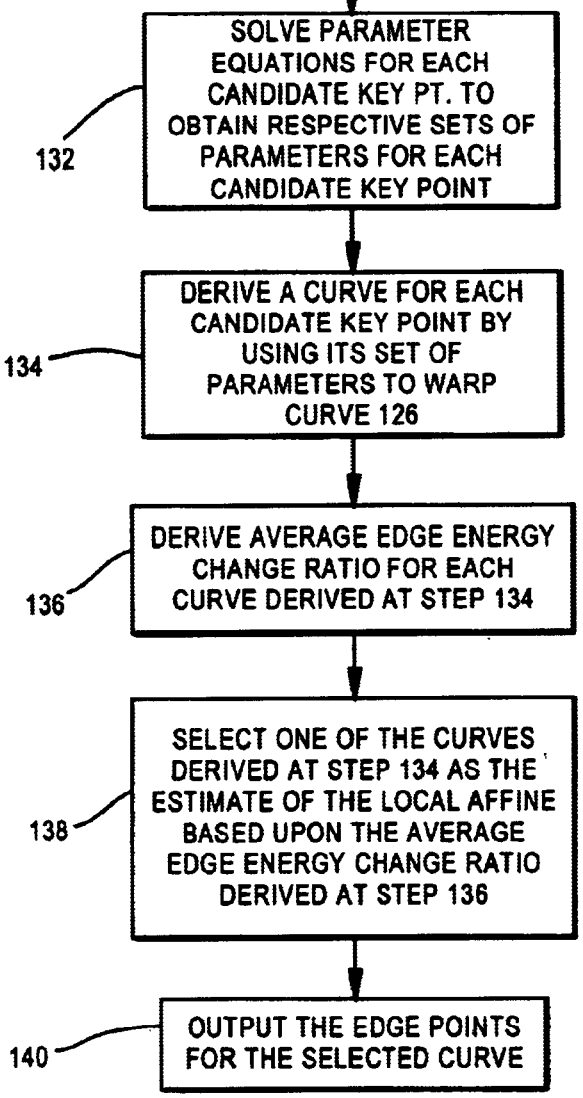
FIG. 10 is a flow chart of a key point search methodology according to an embodiment of this invention.

Referring to FIG. 10, at step 131 all candidate key points are derived. In one embodiment a candidate key point is any image pixel point within the search area 130 with a corresponding edge energy $E^f$ which is larger than a prescribed percentage of the edge energy, $E^{f-1}_{key}$ for the key point found in the previous frame. The prescribed percentage may vary, (e.g., 50%, 40%, 25%). At step 132 the six parameter equations above are solved for each candidate point, plugging in the candidate values for $x^*_{key}$ and $y^*_{key}$. The result is a set of parameters for each candidate key point. At step 134 the curve 126 then is warped using the alternative sets of parameters. The result is a set of curves—one curve for each candidate key point. It is expected, but not necessary, that the actual key point on the actual curve 128 is one of these candidate points and resulting curves.

At step 136 the 'edge energy change ratio' for each point on each curve is derived. More specifically, an average edge energy change ratio for each given curve is derived. The average edge energy change ratio for each curve is an indication which compares the curve's average edge energy to the edge energy for the local affine from the prior frame. At step 138 one of the candidate curve's is elected based on a comparison of the average edge energy change ratio for each candidate curve. In a preferred embodiment the curve having the minimum average edge energy change ratio is selected as the optimal curve for estimating the local affine boundary. In another embodiment an alternative criterion is used.

At step 140 the set of edge points for the selected optimal curve is output as the set of edge points for the local affine portion of the object. These edge points are used at step 94 in deriving the estimated boundary for the entire object for the current image frame. As a result, a more reliable object boundary is estimated which can better handle deformations to local portions of the object.

Meritorious and Advantageous Effects

According to an advantage of this invention, an accurate boundary of an object is tracked for objects which deform or include rapidly moving sub-portions. The ability to track a wide variety of object shapes and differing object deformation patterns is particularly beneficial. Note that the process for selecting a local affine is independent of the process for improving the boundary estimate for the local affine. The process for selecting the local affine may be used with any process for improving the estimated shape and location of the identified local affine. Similarly, the process for improving the boundary of a local affine can be used for any local affine regardless of how identified.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for identifying a local affine deformation occurring along an estimate of an object boundary, in which the estimated object boundary corresponds to an object being tracked among a plurality of image frames, comprising:

calculating an edge energy change ratio for a plurality of edge points describing said estimated object boundary; and identifying a portion of said object boundary less than an entire length of said object boundary as exhibiting a local affine deformation based upon said edge energy change ratio, wherein said step of identifying the portion of said object boundary comprises identifying a sequence of edge points among said plurality of edge points for which the calculated edge energy change ratio exceeds a prescribed threshold for each edge point in said sequence of edge points.

2. The method of claim 1, wherein a beginning edge point and an ending edge point of said sequence of edge points are identified in said step of identifying a sequence of edge points, and wherein said step of identifying the portion of said object boundary further comprises extending the sequence of edge points until the edge energy change ratio for preceding edge points describing the estimated object boundary no longer changes continuously.

3. The method of claim 2, wherein said step of extending the sequence further comprises extending the sequence of edge points until the edge energy change ratio for succeeding edge points describing the estimated object boundary no longer changes continuously.

4. A method for identifying a local affine deformation occurring along an estimate of an object boundary, comprising:

deriving edge information for the estimated object boundary;

identifying a portion of said object boundary less than an entire length of said object boundary as exhibiting a local affine deformation based upon said derived edge information; and executing a local segmentation process on the identified portion of said object boundary exhibiting the local affine deformation to revise the estimated object boundary for the identified portion, said identified portion being a local affine portion of the estimated object boundary the local affine portion having a starting contour point and an ending contour point.

5. The method of claim 4, in which the step of executing comprises:

identifying a plurality of candidate key contour points within a search area;

for each one candidate key contour point of the plurality of candidate key contour points, deriving an associated candidate curve corresponding to said one candidate key contour point, wherein said associated candidate curve includes the starting contour point, the ending contour point and said corresponding one key contour point, wherein for said plurality of candidate key contour points a plurality of associated candidate curves are derived; and selecting one of said plurality of associated candidate curves as a revised estimate of the object boundary for the local affine portion based upon an analysis of edge energy.

6. The method of claim 5, further comprising prior to the step of selecting, the step of deriving an average edge energy change ratio for each one of said plurality of associated candidate curves.

7. The method of claim 6, wherein the step of selecting comprises identifying the candidate curve among the plurality of associated candidate curves which has a minimum average edge energy change ratio and selecting the identified candidate curve as the revised estimate of the object boundary for the local affine portion.

8. The method of claim 5, wherein the step of deriving the associated candidate curve comprises:

deriving a set of local affine parameters based on the starting contour point, the ending contour point and said one candidate key contour point; and modifying the local affine portion of the estimated object boundary based on the derived set of local affine parameters to achieve the associated candidate curve for said one candidate key contour point.

9. A method for revising an estimate of an object boundary for a local affine portion of the estimated object boundary, wherein the local affine portion has a starting contour point and an ending contour point, comprising the steps of:

identifying a plurality of candidate key contour points within a search area;

for each one candidate key contour point of the plurality of candidate key contour points, deriving an associated candidate curve corresponding to said one candidate key contour point, wherein said associated candidate curve includes the starting contour point, the ending contour point and said corresponding one key contour point, wherein for said plurality of candidate key contour points a plurality of associated candidate curves are derived; and selecting one of said plurality of associated candidate curves as a revised estimate of the object boundary for the local affine portion based upon an analysis of edge energy.

10. The method of claim 9, further comprising prior to the step of selecting, the step of deriving an average edge energy change ratio for each one of said plurality of associated candidate curves.

11. The method of claim 10, wherein the step of selecting comprises identifying the candidate curve among the plurality of associated candidate curves which has a minimum average edge energy change ratio and selecting the identified candidate curve as the revised estimate of the object boundary for the local affine portion.

12. The method of claim 9, wherein the step of deriving the associated candidate curve comprises:

deriving a set of local affine parameters based on the starting contour point, the ending contour point and said one candidate key contour point; and modifying the local affine portion of the estimated object boundary based on the derived set of local affine parameters to achieve the associated candidate curve for said one candidate key contour point.

13. The method of claim 9, further comprising prior to the step of identifying the plurality of candidate key contour points, the step of identifying an initial key contour point on the estimated object boundary which resides between the starting contour point and the ending contour point.

14. The method of claim 13, wherein the search area is defined based upon a distance function of the initial key contour point.

15. The method of claim 9, said revising said estimate of the object boundary for the local affine portion of the estimated object boundary is performed for a plurality of image frames, and wherein the step of identifying the plurality of candidate key contour points, comprises:

for each one image point of a plurality of image points within the search area, comparing edge energy of said one image point with edge energy of a final key contour point corresponding to the selected candidate curve for a previous image frame; and identifying each image point of said plurality of image points within the search as a candidate key contour point for a current image frame when the edge energy of said image point is at least a prescribed percentage of the edge energy of the final key contour point.

16. An apparatus for identifying a local affine deformation occurring along an estimate of an object boundary, in which the estimated object boundary corresponds to an object being tracked among a plurality of image frames, comprising:

means for calculating an edge energy change ratio for a plurality of edge points describing said estimated object boundary, and means for identifying a portion of said object boundary less than an entire length of said object boundary as exhibiting a local affine deformation based upon said edge energy change ratio, wherein said means for identifying the portion of said object boundary comprises means for identifying a sequence of edge points among said plurality of edge points for which the calculated edge energy change ratio exceeds a prescribed threshold for each edge point in said sequence of edge points.

17. The apparatus of claim 16, wherein a beginning edge point and an ending edge point of said sequence of edge points are identified by said means for identifying the sequence of edge points, and wherein said means for identifying the portion of said object boundary further comprises means for extending the sequence of edge points until the edge energy change ratio for preceding edge points describing the estimated object boundary no longer changes continuously.

18. The apparatus of claim 17, wherein said means for extending the sequence further comprises means for extending the sequence of edge points until the edge energy change ratio for succeeding edge points describing the estimated object boundary no longer changes continuously.

19. An apparatus for identifying a local affine deformation occurring along an estimate of an object boundary, comprising:

means for deriving edge information for the estimated object boundary;

means for identifying a portion of said object boundary less than an entire length of said object boundary as exhibiting a local affine deformation based upon said derived edge information; and means for executing a local segmentation process on the identified portion of said object boundary exhibiting the local affine deformation to revise the estimated object boundary for the identified portion, said identified portion being a local affine portion of the estimated object boundary the local affine portion having a starting contour point and an ending contour point.

20. The apparatus of claims 19, in which the executing means comprises:

means for identifying a plurality of candidate key contour points within a search area;

means for deriving, for each one candidate key contour point of the plurality of candidate key contour points, an associated candidate curve corresponding to said one candidate key contour point, wherein said associated candidate curve includes the starting contour point, the ending contour point and said corresponding one key contour point, wherein for said plurality of candidate key contour points a plurality of associated candidate curves are derived; and means for selecting one of said plurality of associated candidate curves as a revised estimate of the object boundary for the local affine portion based upon an analysis of edge energy.

21. An apparatus for revising an estimate of an object boundary for a local affine portion of the estimated object boundary, wherein the local affine portion has a starting contour point and an ending contour point, comprising:

means for identifying a plurality of candidate key contour points within a search area;

means for deriving, for each one candidate key contour point of the plurality of candidate key contour points, an associated candidate curve corresponding to said one candidate key contour point, wherein said associated candidate curve includes the starting contour point, the ending contour point and said corresponding one key contour point, wherein for said plurality of candidate key contour points a plurality of associated candidate curves are derived; and means for selecting one of said plurality of associated candidate curves as a revised estimate of the object boundary for the local affine portion based upon an analysis of edge energy.

22. The apparatus of claim 21, further comprising:

means for deriving an average edge energy change ratio for each one of said plurality of associated candidate curves.

23. The apparatus of claim 22, wherein the selecting means comprises means for identifying the candidate curve among the plurality of associated candidate curves which has a minimum average edge energy change ratio and selecting the identified candidate curve as the revised estimate of the object boundary for the local affine portion.

24. The apparatus of claim 21, wherein the means for deriving the associated candidate curve comprises:

means for deriving a set of local affine parameters based on the starting contour point, the ending contour point and said one candidate key contour point; and means for modifying the local affine portion of the estimated object boundary based on the derived set of local affine parameters to achieve the associated candidate curve for said one candidate key contour point.

25. The apparatus of claim 21, further comprising means for identifying an initial key contour point on the estimated object boundary which resides between the starting contour point and the ending contour point.

26. The apparatus of claim 25, wherein the search area is defined based upon a distance function of the initial key contour point.

27. The apparatus of claim 21, wherein said the revising of said estimate of the object boundary for the local affine portion of the estimated object boundary is performed for a plurality of image frames, and wherein the means for the plurality of candidate key contour points, comprises: means for comparing, for each one image point of a plurality of image points within the search area, edge energy of said one image point with edge energy of a final key contour point corresponding to the selected candidate curve for a previous image frame; and means for identifying each image point of said plurality of image points within the search as a candidate key contour point for a current image frame when the edge energy of said image point is at least a prescribed percentage of the edge energy of the final key contour point.

* * * * *